United States Patent [19]

O'Hare et al.

[11] Patent Number: 5,972,510
[45] Date of Patent: Oct. 26, 1999

[54] SPHERULITE PARTICLES OF ISOTACTIC POLYPROPYLENE

[75] Inventors: Dermot O'Hare; Jonathon Tudor, both of Oxford, United Kingdom

[73] Assignee: Isis Innovation Limited, United Kingdom

[21] Appl. No.: 08/869,975

[22] Filed: Jun. 5, 1997

[51] Int. Cl.[6] ....................................................... B32B 5/16

[52] U.S. Cl. ........................... 428/407; 427/212; 427/221

[58] Field of Search ................................... 428/402, 403, 428/407; 427/212, 221

[56] References Cited

PUBLICATIONS

J. Tudor et al., Chem. Commun. (1997), 603–604.

Primary Examiner—Hoa T. Le
Attorney, Agent, or Firm—Wenderoth, Lind & Ponack

[57] ABSTRACT

Olefins may be polymerised in the presence of a catalytic system comprising a metallocene and an organic aluminum compound supported on a mesoporous material to produce polyolefins. The mesoporous material comprises atoms of one or more elements selected from the group consisting of Group 1, 2, 3 and 5 elements germanium, tin, lead and transition metals. The polyolefins are produced as spherulite particles of average diameter from about 5 μm to about 20 μm which have a distinct core and shell arrangement.

5 Claims, 3 Drawing Sheets

SPHERULITE PARTICLES OF ISOTACTIC POLYPROPYLENE

This invention relates to the polymerisation of olefins and to the polyolefins thereby produced. Propene is a preferred olefin for use in the invention.

Polypropylene (or polypropene) is probably the most marketable and versatile of the polyalkenes produced industrially and is found in many industries from the automotive trade to the leisure industry. Of the three forms of polypropylene, the highly ordered, high molecular mass isotactic form is the most important. Under homogeneous conditions, isotactic polypropylene (IPP) can be produced by chiral ansa-metallocenes such as rac-EBI-zirconium dichloride [EBI=1,2-bis(inden-1-yl)-ethane] in combination with a co-catalyst, e.g., methylaluminoxane (MAO). Compared to polypropylenes produced by classical heterogeneous Ziegler-Natta catalysts, molecular masses and melting points are low, making the products of little commercial worth for most technical applications.

A silica-supported metallocene catalyst which yielded isotactic polypropylene with high molecular mass and high melting point has been reported by W. Kaminsky and F. Renner, *Makromol. Chem. Rapid Commun.*, 1993, 14, 239. However, this is in contrast to previous studies of metallocenes supported on silica where high activities for polymerisation were reported but with low molecular masses and low melting points.

Mesoporous (pore diameter about 20 to 500 Å) inorganic solids, such as molecular sieves, are used extensively as heterogeneous catalysts and adsorption media. These materials are useful because their pore sizes allow molecules to enter the structure into cavities which enhance selectivity, catalytic activity and adsorptive capacity. Mesoporous inorganic solids of this type include siliceous and aluminosilicate materials such as the family of molecular sieves designated as M41 S, of which MCM-41 is a member (see, for example, J. S. Beck et al., *J. Am. Chem. Soc.* 1992, 114, 10834–10843).

The polymerisation of propene using EBI-zirconium dichloride and MAO supported on a mesoporous support of purely siliceous MCM-41 has been disclosed by Y. S. Ko et al., *Makromol, Rapid Commun.* 1996, 17(11), 749–758. The resulting polypropylene is obtained in the form of relatively large, apparently amorphous particles.

JP-A-08-027210 broadly relates to the polymerisation of olefins with metallocenes and organic aluminium compounds supported on MCM-41 to give polymers which are claimed to have good particle property and sharp molecular weight distribution.

Processability is an important property of polymers; if a polymer cannot be processed readily, then it can be of little commercial value. Therefore, producing polyolefins in a form which can be readily processed is highly desirable.

The present invention is based on the surprising finding of a process which produces polyolefins in a form which is expected to have significant advantages in terms of its processability over the amorphous forms of polyolefins produced by the prior art polymerisation processes.

Therefore, it is an aim of the present invention to produce polyolefins in a form which has improved properties in terms of its processability compared to prior art amorphous products.

It is a further aim of the invention to provide a process for producing polyolefins in the form of processible particles obtained directly from the polymerisation of olefins.

Accordingly, the present invention provides a process for producing a polyolefin in the form of spherulite particles which process comprises polymerising an olefin or a mixture of olefins in the presence of a catalytic system comprising a metallocene and an organic aluminium compound, wherein the catalytic system is supported on a mesoporous material which comprises atoms of one or more elements selected from the group consisting of Group 1, 2, 3 and 5 elements, germanium, tin, lead and transition metals.

Preferably, where the stereochemistry of the polyolefin permits, the polyolefin which is produced in the process of the invention is isotactic. Isotactic polyolefins can be produced using chiral metallocenes. The term "isotactic", as used herein, takes the meaning which is normally attributed to it in the art of polyolefin production. Thus, the term is not necessarily so precise as to require 100% isotacticity for each polymer chain and the isotactic polyolefins of the invention may have only a predominance for isotacticity in their structure.

The polyolefin spherulite particles of the invention have variable sizes. Their maximum dimensions will typically fall within the range of 2 to 100 $\mu$m, preferably 3 to 80 $\mu$m. The particles may be agglomerated to form larger particles which retain some identifiable structure of the original (smaller) spherulite particles. Preferably, the particles have an average particle diameter of from about 5 $\mu$m to about 20 $\mu$m.

The polyolefin particles of the invention have a distinct core and shell arrangement which is atypical for most homogeneously produced polymers. Particles produced by homogeneous systems generally have a very open porous structure and appear to be composed entirely of sub-particles about 1 $\mu$m in diameter.

The core and shell arrangement of the particles of the invention cannot, of course, normally be seen in the intact particles. However, when the particles are fractured, for example by crushing at low temperatures (e.g., below $-100°$ C.), the core and shell structure can be seen using scanning electron microscopy (SEM).

Spherulites are essentially spherical or spheroidal aggregates and represent a common structural feature of polymer organisation in bulk polymers. However, as far as the inventors are aware, single spherulite particles of polyolefins such as polypropylene have not previously been produced directly by the polymerisation of the olefins (e.g., propene). Spherulites can be recognised by their characteristic appearance under a polarising microscope where they are ideally seen as circular birefringent areas possessing a dark Maltese cross pattern. The spherulite particles of the invention exhibit birefringence of this type.

The polyolefin particles of the invention may be derived from any olefin or mixture of olefins but are preferably of polypropylene or copolymers of propene with other olefinic monomers. Thus, the olefin polymerised in the process of the invention is preferably propene or a mixture of propene with other monomers. Isotactic polypropylene (IPP) is a preferred product of the process of the invention.

The IPP spherulite particles produced by the process of the invention preferably consist of IPP having a number average molecular mass of about 12,000 and/or a polydispersity of about 1.95 and a melting point of from about 138 to about 145° C.

The mesoporous material used in the process of the invention is preferably a silicate comprising atoms of one or more additional elements selected from the group consisting of Group 1, 2, 3 and 5 elements, germanium, tin, lead and transition metals. More preferably, the mesoporous material is an aluminosilicate i.e., the additional element is aluminium. The mesoporous material is a porous material having a pore size within the range of from 20 to 100 Å and may be, for example, a hexagonal mesoporous material having a lattice constant of from about 35 to 45 Å. Suitable mesoporous materials are molecular sieves such as MCM-41 which comprises aluminium and silicon in the molar ratio of approximately 2.6 to 40. The mesoporous material used in the process of the invention, particularly the fact that the material is not purely siliceous, is believed to be at least partly responsible for the process advantageously producing polyolefin as spherulite particles rather than in an amorphous form.

The metallocene catalyst used in the process of the invention is preferably chiral or a mixture of enantiomers which has a greater amount of one enantiomer than the other, in order to produce an isotactic polyolefin. Suitable metallocene catalysts are the transition metal compounds $LMX_{n-1}$ and $L_2MX_{n-2}$ wherein M is a Group 3A, 4A or 5A transition metal, L is a monovalent cycloalkadienyl, triso or 5-membered heterocyclic ligand, X is a monovalent ligand selected from hydrogen, alkyl and halogen (i.e., fluorine, chlorine, bromine or iodine) and n is the oxidation state of M in the compound. In compounds $L_2MX_{n-2}$, the L ligands may be linked by a bridging group such as a $C_1$–$C_6$ alkylene (e.g., methylene or ethylene) group. Preferably M is Zr and the currently preferred catalyst is rac-EBI zirconium dichloride.

The process of the invention is carried out in the presence of an organic aluminium compound. The organic aluminium compound may be any compound which is conventionally used as a co-catalyst with a transition metal compound in the polymerisation of olefins. The compounds have at least one alkyl group bound to aluminium and the preferred compound is methylaluminoxane (MAO).

The catalytic system is preferably loaded onto the mesoporous material by treating the material with a solution of the metallocene compound and the organic aluminium compound, either in one step by using a solution containing both compounds or in two steps by applying each compound to the material separately. The solvent, which is preferably an organic solvent such as toluene, is removed by heating to leave the metallocene compound and/or the organic aluminium compound supported on the material. The mesoporous compound may require dehydration (by heating) prior to application of the catalytic compounds. Typical loadings may be about 0.20 to about 0.50 mmol of metal in the metallocene (e.g., zirconium) and about 2 to about 10 mmol of aluminium per gram of mesoporous material.

The polymerisation process of the invention may be carried out using conventional techniques. Thus, the polymerisation may take place in a reactor containing the catalytic system on its support and the olefin or mixture of olefins at a pressure above atmospheric pressure for a time sufficient to produce the polyolefin, such as 30 minutes to 2 hours, for example. Preferably, a solution of the organic aluminium compound in a suitable solvent is added to the reactor to increase the ratio of aluminium to zirconium in the reaction mixture. The polyolefin is recovered from the reaction mixture, as spherulite particles, by reducing the pressure in the reactor, quenching the mixture (e.g., with ethanol and water) and collecting the polymer by filtration.

In the accompanying drawings

Figure 1:
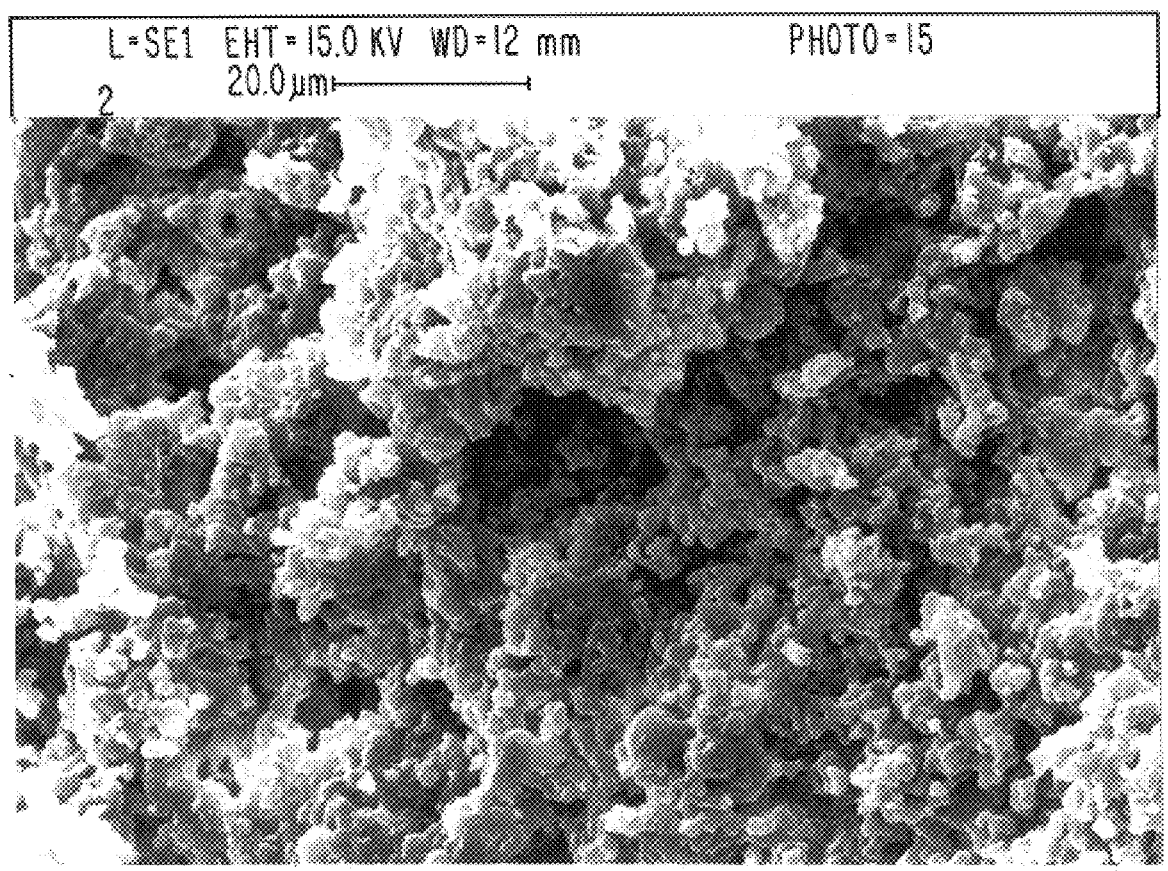
FIG. 1 is an SEM micrograph of IPP produced by a homogeneous solution of EBI—$ZrCl_2$.

The invention will now be described, by way of illustration only, with reference to the following non-limiting examples.

EXAMPLES

Example 1

1. Preparation and Modification of MCM-41

Aluminosilicate MCM-41 was prepared by the method of Beck at al., *J. Am. Chem. Soc.,* 1992, 114, 10834–10843.

The activation of the surface sites was achieved by following a similar procedure to that used by Woo et al., (*Macromol. Rapid Commun.,* 16, 489 (1995)) to modify the surface of NaY zeolite. Prior to modification, MCM-41 was first dehydrated at 100° C. under high vacuum ($4.5 \times 10^{-5}$ mbar) for 4 hours. Treatment of the anhydrous material with a toluene solution of MAO, followed by heating to 70° C. for 2 hours produces a white, air sensitive solid material after filtration, washing and drying in VaCuO. Powder X-ray diffraction of the material reveals that the host hexagonal arrangement of channels is still intact. The Al content as determined by elemental microanalysis gives a loading of 6.1 mmol (Al).$g^{-1}$ of silicate, the C:H: Al ratio being 2.50:2.95:1.

The MAO functionalised MCM-41 was suspended in a toluene solution of rac-EBIZrCl$_2$ and heated to 50° C. for 18 hours. Filtration and washing with hot toluene (3×30 mL) produced a rose coloured material. Elemental microanalysis shows the loading of Zr to be 0.35 mmol $g^{-1}$.

Powder X-ray diffraction of the grafted materials indicates that the hexagonal host structure is retained during the formation of the catalysts.

2. Polymerisation of Polypropylene

Pure grade propylene (BOC) was further purified by passage through 4 Å molecular sieves and finely divided potassium supported on steel wool. The solid catalyst obtained above was loaded in a Fischer-Porter reactor vessel under an inert atmosphere, such that the vessel contained 25 $\mu$mol Zr. Toluene (150 mL) was transferred under a positive pressure of dinitrogen into the reactor vessel and the suspended solid vigorously stirred with the aid of a magnetic stirrer at a constant temperature maintained by the use of a thermostatically heated water bath.

A solution of MAO (10%, in toluene) (26,0 mL) was added to the reaction vessel so as to achieve the desired ratio of mol (MAO): mol (Zr) of 1000:1.

The reactor vessel was evacuated until no more dinitrogen evolved, and then back filled with either propylene or ethylene. The pressure in the reactor vessel was increased to and maintained at 5.0 bar.

After exactly 60 minutes, the polymerisation mixture was quenched by venting the propylene followed by the addition of copious amounts of ethanol, then water.

After the addition of ethanol and water, the solid polymer was collected on a sintered glass funnel, washed with deionised water (3×30 mL), ethanol (3×30 mL), and diethyl ether (3×30 mL), before being dried in vacuo to constant weight.

3. Results

The results of the polymerisation tests are summarised in the following table:

TABLE 1

Propylene Polymerisation Activities and Polymer Properties

| Test | Material | Ratio Zr:MAO | Loading mmol (Zr) g$^{-1}$ | Activity Kg/mol (Zr).h | $\overline{M}_n$ §GPC | Polydispersity |
|------|----------|--------------|---------------------------|------------------------|----------------------|----------------|
| A    | 1        | 0            | 0.35                      | 0                      | 0.0                  | 0.0            |
| B    | 1        | 1:1000       | 0.35                      | 1163                   | 11849                | 1.95           |
| C    | 2        | 1:1000       | 2.390                     | 4941                   | 3110                 | 1.91           |
| D    | 3        | 1:1000       | 0.14                      | 3033                   | 14038                | 1.92           |
| E    | 4        | 0            | 0.255                     | 0                      | —                    | —              |
| F    | 4        | 1:1000       | 0.255                     | 944                    | —                    | —              |
| G    | 5        | 1:1000       | 3.421                     | 1761                   | 863¶                 | 1.92           |

1 = MCM-41-MAO-rac EBIZrCl$_2$,
2 = rac EBIZrCl$_2$,
3 = Laponite-rac-EBIZrCl$_2$,
4 = MCM-41-MAO-Zr ($\eta$-C$_5$H$_5$)$_2$Cl$_2$,
5 = Zr ($\eta$-C$_5$H$_5$)$_2$Cl$_2$,
¶ Samples not fully soluble in THF so samples were filtered prior to analysis.
§GPC vs. polystyrene.

Test B is an example of the process of the present invention. The other tests (A, C, D, E, F and G) are presented for comparative purposes. The supported materials for Tests A, D, E and F were produced in the same manner as the supported material used in Test B.

Inspection of Table 1 reveals several interesting properties of the isotactic polypropylene produced by the three different forms of rac-EBIZrCl$_2$ (Tests A, B, C and D). With respect to activity, the homogeneous system (Test C) proves to be the most active. Out of the two supported catalysts, the clay support (Test D) proves to be more active than the mesoporous support (Tests A and B) by about three fold. Without wishing to be bound by theory, it is believed that this may be at least partly due to diffusion limiting effects, suggesting that, to a great extent, polymerisation takes place at active sites located within the mesoporous channels.

The rac-EBIZrCl$_2$ supported catalyst (Test B) produces a polymer which is insoluble in most solvents. The $^{13}$C NMR of the polymer shows its highly isotactic nature. The melting point of the IPP produced by the MCM-41/MAO/EBIZrCl$_2$ is 134° C., some 10 degrees higher than IPP produced by the equivalent homogeneous MAO/EBIZrCl$_2$ system. The number average molecular weight and molecular weight distribution of the IPP produced by the MCM-41 supported material was 11849 and 1.95 respectively, compared to 33110 and 1.91 of the polymer produced by the homogeneous system.

Figure 2:
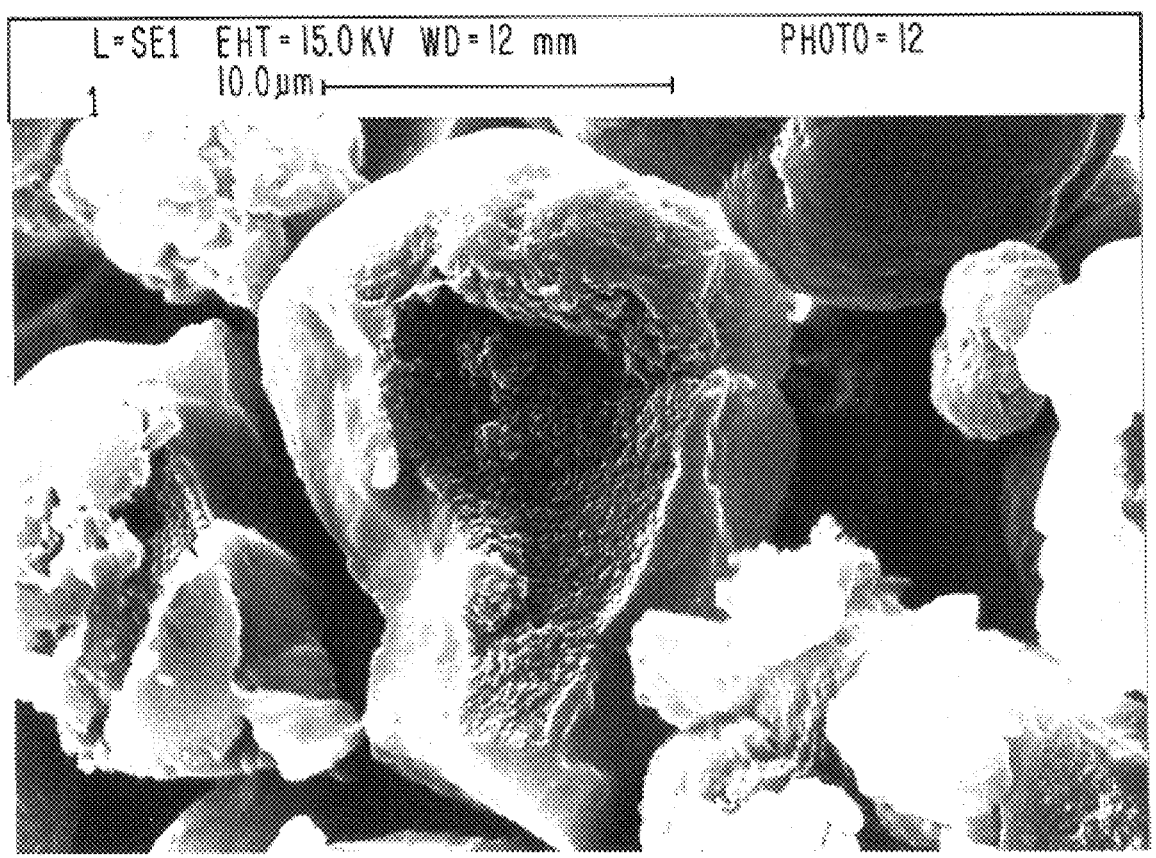
FIG. 2 is a SEM micrograph of fractured IPP particles according to the invention, showing the core and shell structure of the spherulite particles.

To assess morphological differences between the three isotactic polymer samples of Tests B, C and D, scanning electron microscopy (SEM) was used. FIGS. 1 and 2 show micrographs of homogeneously and MCM-41 produced polymer samples, respectively. Inspection of the micrographs reveals striking differences between the two samples. The polymer produced by the homogeneous system (FIG. 1) consists of particles with a very porous open structure and appears to be composed entirely of sub-particles around 1 $\mu$m. A similar structure is observed for polymer produced by the clay support, except that the average particle size is much larger at about 10 $\mu$m. The micrograph also reveals that the plate-like morphology of the clay material has been replicated in the polymer. The SEM micrograph for the MCM-41 produced IPP (FIG. 2) exhibits some quite remarkable features. The catalyst produces spherulite particles of approximate diameter 10 $\mu$m. The internal structure of the polymer grains can also be probed by crushing it at −120° C. and then re-examining the sintered particles with SEM. The micrograph of such a broken particle is shown in FIG. 2. This clearly shows that the very fine scale of the internal structure of the polymer is substantially different from the external structure; suggesting that the polymer consists of a distinct core and shell arrangement, a feature which is atypical for most homogeneously produced polymers. Similar freezing and shearing of the homogeneous and clay samples shows no difference between their internal and external morphology. The MCM-41 produced polymer was also studied under crossed polarising microscope. From the optical micrograph the sphericular nature of the polymer becomes clear from the large birefringent regions of the central particle. Spherulites are a morphological feature of bulk crystallised polymers with a large number of lamellar crystallites radiating in all directions from one central nucleus with well defined boundaries. The observation of birefringence in the optical measurement indicates a general tangential arrangement of the chains within the spherulites.

Figure 3:
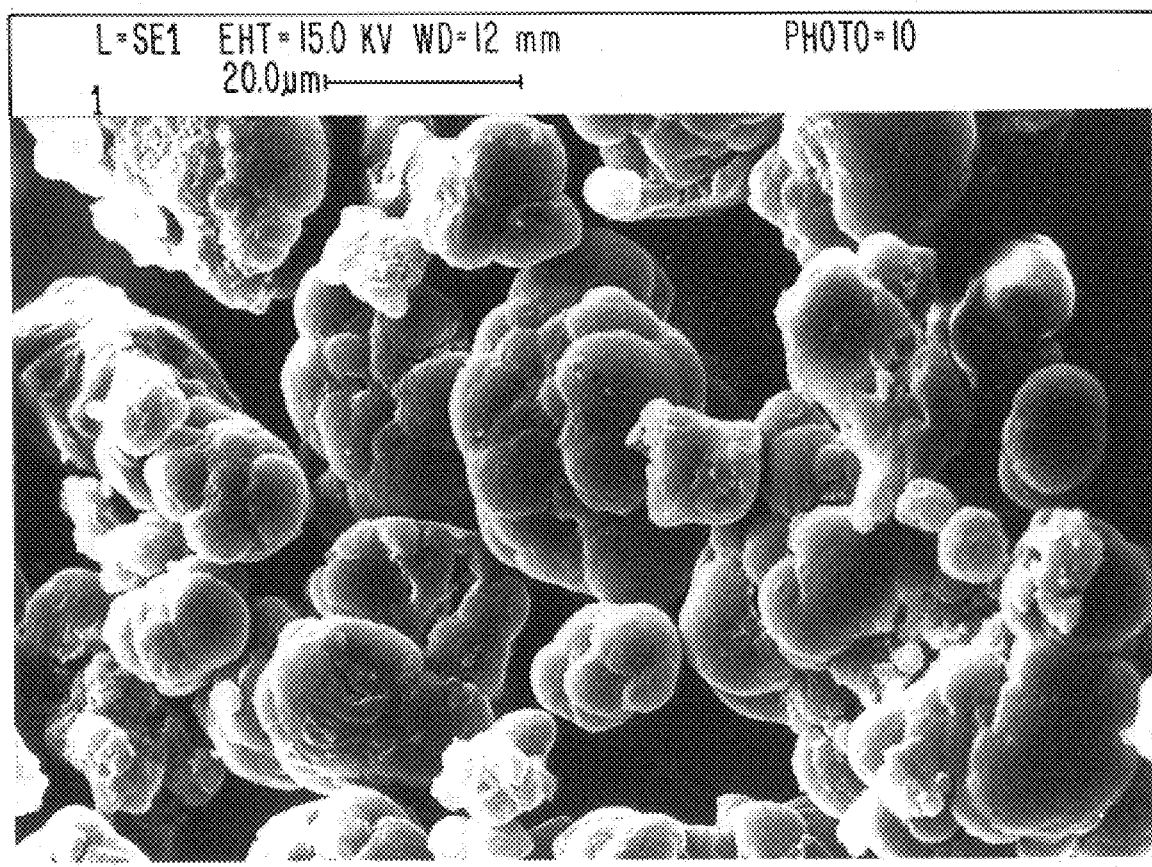
FIG. 3 is a SEM micrograph of intact IPP particles according to the invention.

FIG. 3 is a micrograph showing unbroken spherulite IPP particles of the invention.

This example shows that aluminosilicate MCM-41 is effective in providing a solid support for the homogeneous chiral catalyst rac-[ZrCl$_2$(EBI)] and its application toward controlling polymer morphology. Also, polypropylene produced by the MCM-41 derived catalyst surprisingly consists entirely of spherulite particles, with a distinct shell and core morphology. The polymer not only has the advantage of being potentially readily processible, on account of its spherulite particulate structure, but has the further advantages of being highly isotactic and exhibiting higher melting points than the corresponding homogeneous and clay supported systems.

Example 2

Example 1 was repeated using ethylene (ethene) instead of propene as the olefin to give polyethylene as the reaction product and the polymerisation step was carried out at a pressure of 2.0 bar.

After the polymerisation reaction, the polymer was collected on a sintered glass funnel, washed with deionised water (3×30 mL), ethanol (3×30 mL) and diethyl ether (3×30 mL).

The results of the ethylene polymerisation tests are shown in Table 2:

TABLE 2

Ethylene Polymerisation Activities and Polymer Properties

| Test | Material | Ratio Zr:MAO | Loading mmol (Zr) g$^{-1}$ | Activity Kg/mol (Zr).h | $\overline{M}_n$ §GPC | Polydispersity |
|---|---|---|---|---|---|---|
| A | 1 | 1:33 | 0.255 | 173 | 112000 | 3.4 |
| B | 2 | 1:33 | 0.339 | 130 | 94900 | 3.2 |
| C | 3 | 1:33 | 3.424 | 553 | 10900 | 4.3 |

1 = MCM-41/MAO/Zr ($\eta$-C$_5$H$_5$)$_2$Cl$_2$,
2 = Laponite/MAO/Zr ($\eta$-C$_5$H$_5$)$_2$Cl$_2$,
3 = Zr ($\eta$-C$_5$H$_5$)$_2$Cl$_2$/MAO.
§GPC vs. polystyrene.

The results of ethylene polymerisation outlined in Table 4.2 show similar effects to the polymerisation of propylene; increases in $\overline{M}_n$ and lower activities for the supported catalysts.

We claim:

1. Spherulite particles of isotactic polypropylene having a distinct core and shell structure which are produced by a process comprising polymerizing propene in the presence of a catalytic system comprising a metallocene and an organic aluminum compound, wherein the catalytic system is supported on a mesoporous material which comprises atoms of one or more elements selected from the group consisting of Group 1, 2, 3 and 5 elements, germanium, tin, lead and transition metals.

2. Polypropylene particles as claimed in claim 1 which have an average particle diameter of from about 5 µm to about 20 µm.

3. Polypropylene particles as claimed in claim 1, wherein the polyolefin has a number average molecular mass of about 12,000.

4. Polypropylene particles as claimed in claim 1 which exhibit birefringence when studied under a crossed polarizing microscope.

5. Polypropylene particles as claimed in claim 1, wherein the isotactic polypropylene having a melting point of from about 138 to about 145° C. and a polydispersity of about 1.95.

* * * * *